United States Patent
Pereira et al.

(10) Patent No.: US 6,766,840 B2
(45) Date of Patent: Jul. 27, 2004

(54) TIRE WITH IMPROVED ENDURANCE

(75) Inventors: Pedro Costa Pereira, Clermont-Ferrand (FR); David Jardine, Clermont-Ferrand (FR)

(73) Assignee: Michelin Recherche et Technique S.A., Grange-Paccot (CH)

( * ) Notice: Subject to any disclaimer, the term of this patent is extended or adjusted under 35 U.S.C. 154(b) by 279 days.

(21) Appl. No.: 10/138,839

(22) Filed: May 3, 2002

(65) Prior Publication Data

US 2002/0185206 A1 Dec. 12, 2002

Related U.S. Application Data

(63) Continuation of application No. PCT/EP00/10414, filed on Oct. 23, 2000.

(30) Foreign Application Priority Data

Nov. 5, 1999 (FR) .............................................. 99 14031

(51) Int. Cl.[7] .............................. B60C 9/00; B60C 9/20; B60C 9/22
(52) U.S. Cl. ....................... 152/527; 152/531; 152/532; 152/533; 152/537
(58) Field of Search ................................ 152/531, 533, 152/527, 532, 537

(56) References Cited

U.S. PATENT DOCUMENTS

| 5,373,886 A | 12/1994 | Yamaguchi et al. |
| 5,971,050 A | 10/1999 | Debroche |

FOREIGN PATENT DOCUMENTS

| EP | 0 329 593 A1 | | 8/1989 |
| EP | 0 488 734 A1 | | 6/1992 |
| EP | 0 845 348 A1 | | 6/1998 |
| JP | 09193611 A | * | 7/1997 |
| JP | 11115413 A | * | 4/1999 |
| WO | WO 99/25571 | | 5/1999 |

OTHER PUBLICATIONS

Abstract of Japan JP 06 129804, Date May 13, 1994.

* cited by examiner

*Primary Examiner*—Adrienne C. Johnstone
(74) *Attorney, Agent, or Firm*—Martin Farrell; Alan A. Csontos; E. Martin Remick

(57) ABSTRACT

The invention concerns a tire whose crown contains a ply of circumferentially oriented cords. That ply is so arranged that in sensitive zones, as, for example, at the side ends of the adjacent crown reinforcing ply, the laying pitch of the circumferentially oriented cords is markedly increased. That considerably lessens the risk of damage to the circumferentially oriented cords in those zones.

36 Claims, 4 Drawing Sheets

TIRE WITH IMPROVED ENDURANCE

This application is a continuation of PCT/EP00/10414, filed Oct. 23, 2000.

BACKGROUND OF INVENTION

The invention concerns a vehicle tire and, notably, a tire whose architecture is optimized in order to reinforce its endurance and speed resistance.

It is now common for tires of passenger cars designed to run at high speeds to embody an additional ply of circumferentially oriented cords. That ply can be placed above the crown reinforcement plies at angles also commonly used.

In such a configuration, that ply of circumferentially oriented cords is the radially outermost ply of the tire crown.

A break of one or more of those circumferential cords on rolling can shorten the lifetime of the tire. In fact, such breaks reduce the binding of the crown, but can also lead to seepage of water along the circumferential cords, which can entail wire corrosion phenomena.

A zone sensitive to circumferential cord ply damage is the lateral end of the working ply closest to the circumferential cords, owing to the short distance between those circumferential cords and the ends of the wire cords of the working ply. The damage to the circumferential cords can be due, notably, to abrasive contacts with the ends of the cords of the ply at the outermost angle.

Tire designers have proposed various arrangements for keeping the circumferential cords away from the ends of the reinforcing plies at angles from the crown, notably, through the addition of rubber flanging layers.

These arrangements make the tire more difficult to manufacture and increase its cost. Furthermore, the shaping operations make industrial control of these complementary operations subject to time variations.

SUMMARY OF THE INVENTION

The object of the present invention is to present an economical arrangement for solving that technical question.

In what follows, "cord" is understood to mean monofilaments as well as multifilaments, or assemblages like cables, yarns or even any type of equivalent assemblage, whatever the material and treatment of those cords, like, for example, surface treatment or coating or pre-sizing to promote adherence to the rubber.

"Rubber bonding layer" for a given reinforcing ply is understood to mean the rubbery compound in contact with the ply reinforcing cords, adhering to the latter and filling the interstices between adjacent cords.

"Contact" between a cord and a rubber bonding layer is understood to mean the fact that at least one part of the outer circumference of the cord is in close contact with the rubber compound constituting the rubber bonding.

"Titer" is understood to mean the weight in grams of one thousand meters of a cord. The titer is expressed in tex. The stress undergone by a cord or the modulus of that cord is expressed in "cN/tex", cN meaning centinewton.

"Laying pitch p" of a generally circumferentially oriented and spiral-wound cord is understood to mean the distance transversely separating the axes of two adjacent cord turns. The laying pitch is the inverse of "laying density d," which corresponds to the number of cord turns contained in a given axial width: $p=1/d$. Usually, d is expressed in number of cords per decimeter (f/dm) and p by millimeters; thus, $p=100/d$.

The "high-temperature contraction potential" of a textile cord called "CS" is understood to mean the relative variation of length of a textile cord positioned, under a prestress equal to the half-sum of the titers of each of the elementary fibers, between the platforms of a furnace (TESTRITE type apparatus) regulated at a constant temperature of 185 ±0.5° C. The CS is expressed in % by the following formula:

$$CS(\%)=100\times|L_1-L_0|/L_0$$

where $L_0$ is the initial length of the adhered cord at room temperature under a prestress equal to the half-sum of the titers of each of the elementary fibers and $L_1$ is the length of that same cord at 185° C. The length $L_1$ is measured at the end of a cord stabilization time at temperature of 185° C., equal to 120 s±2%. The standard deviation on the measurement of CS is ±0.15%.

That potential is a direct consequence of the set of operations that the cord has undergone on its elaboration or on its use.

The invention concerns a tire containing a crown extended by two sidewalls and two beads, a carcass anchored in the two beads, in which the crown radially comprises from inside:

at least one reinforcing ply of axial width L, formed by parallel cords oriented at an angle α relative to the circumferential direction of between 10 and 75 degrees, and at least one ply of cords obtained by spiral winding of the cords in a generally circumferential direction, arranged radially outside relative to the reinforcing ply and extending axially beyond the reinforcing ply.

This tire is characterized in that, in the zones axially placed relative to the equatorial plane P of the tire at a distance ranging between L/2−h and L/2+H, the laying pitch of the cords is greater than or equal to the axial distance H+h, in that the values of H and h are equal or over 2 mm and in that said ply of cords arranged in a generally circumferential direction has an axial width strictly over L+2 H.

The fact that in this zone the laying pitch of the circumferentially oriented and spiral-wound cords is greater than or equal to the axial distance H+h means that, from one side of that zone to the other, only one circumferential cord turn has been arranged at most. This embodiment therefore appreciably diminishes the likelihood of an accidental break of that cord due to an abrasive contact between that cord and a cord of the adjacent ply and thus reinforces the resistance of the tire as a whole.

The invention also concerns a similar tire in which the ply of circumferential cords comprises, at least on one side of the equatorial plane P of the tire, a first spiral winding extending from the equatorial plane P to an axial distance of L/2−h and at least a second spiral winding axially extending outward beyond an axial distance L/2+H from the equatorial plane of the tire.

That embodiment has the advantage of not entailing any risk of contact between the cords of the circumferential ply and the axial end of the cords of the reinforcing ply formed by cords oriented at angle α. Industrial production is, however, somewhat longer by reason of the interruption and resumption of laying of the circumferential cords.

The laying pitch of the ply of generally circumferentially oriented spiral-wound cords is advantageously less in the zone axially placed outside beyond the axial distance L/2+H than the laying pitch of the cords in the center zone of the tire crown.

That makes it possible to compensate for the absence of binding opposite the axial end of the crown reinforcing ply of width L in order to obtain a uniform binding. Binding can also be increased in the shoulder zone in order to improve resistance to high speeds of the tire.

For a similar purpose, the laying pitch of the circumferential cords can also be reduced in the zone placed axially placed in proximity to the axial distance L/2−h.

When the tire crown includes a second reinforcing ply of axial width L', radially inward from the first, formed by parallel cords oriented at an angle β of between 10 and 75 degrees, the ply of circumferential cords can extend axially within or beyond distance L'/2 from the equatorial plane of the tire, depending on the level of high-speed resistance sought.

According to one particular embodiment, the tire tread is, on at least a given axial zone of the crown, in direct contact with the circumferentially oriented cords. That facilitates manufacture of the tire by reducing the number of products to be laid. When the tread contains a first compound intended to come in contact with the road, as well as an underlayer radially placed under the first compound, it is the underlayer which is advantageously in direct contact with the circumferentially oriented cords.

The so-called underlayer compounds are intended to improve different performances like the consumption or drift rigidity of the tires.

The ply of generally circumferentially oriented cords advantageously consists of at least two simultaneously spiral-wound cords. That makes it possible to reduce the ply laying time. The maximum number of cords that can be simultaneously wound is at most four.

The simultaneous winding of two to four cords makes it possible to reduce the laying time of the ply of circumferential cords appreciably, since the laying pitch is doubled, while maintaining the same cord density. That does not appreciably increase the likelihood of abrasive contacts between the circumferentially oriented cords and the end of the cords oriented at α in the critical zone. Beyond four cords laid simultaneously, the length of contact possible increases, so that the benefit of the invention disappears.

Preferably, h ranges between 2 and 10 mm, and H is greater than 2 mm.

The generally circumferentially oriented and spiral-wound cords advantageously develop a stress under 3% strain greater than 12 cN/tex and preferably greater than 20 cN/tex. Those cords therefore present a high modulus of elasticity at elevated strains, which makes it possible for the ply they form to assume all its functions, notably, binding of the crown at high speed, while maintaining a relatively low laying density.

Those cords can present an initial modulus less than 900 cN/tex and preferably less than 800 cN/tex. The low initial modulus of those cords has the advantage of improving comfort of the tire and reducing its low-speed coast by running noise.

Such a cord can be a hybrid cable combining at least one nylon yarn and at least one aramid yarn.

The circumferentially oriented cords advantageously present a standard contraction potential at high temperature below 3.5%. That makes it possible to limit their contraction on vulcanization of the tire and thus reinforce in all the working variants described the likelihood of avoiding, in operation, all abrasive contact between the circumferentially oriented cords and those oriented at a and radially arranged inward.

It is also advantageous to spiral-wind the cords with laying diameters roughly corresponding to the final diameters of the cords in the tire after vulcanization. As previously, that reinforces the probability of avoiding, in operation, any abrasive contact between the circumferentially oriented cords and those oriented at a and radially arranged inward.

The embodiments described also have the advantage of making it possible to reduce the quantity and thickness of the rubber flanging layers. This is favorable in terms of thickness and heating at the shoulder.

DESCRIPTION OF THE DRAWINGS

Several embodiments of the invention are now described by means of the attached drawings in which.

DESCRIPTION OF PREFERRED EMBODIMENTS

Figure 1:
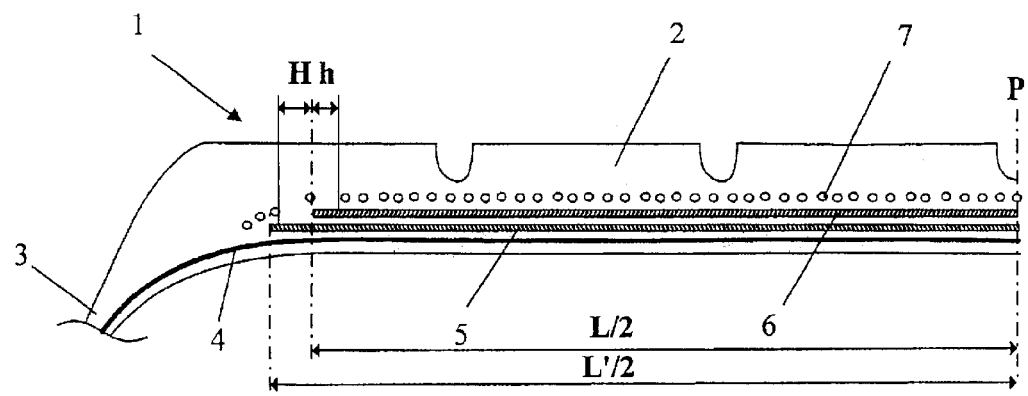
FIG. 1 presents an axial half-section of the tire according to the invention.

FIG. 1 presents a schematic axial half-section of a tire 1 according to the invention. That tire includes a crown 2 extended by two sidewalls 3 and two beads not represented. The crown contains a carcass ply 4 anchored in known fashion in the two beads, two reinforcing plies 5 and 6 formed by parallel cords in each ply and crossed from one ply to the next by forming angles (α, β) with the circumferential direction of approximately 30 degrees and a ply of cords generally oriented circumferentially 7. The carcass ply 4 is oriented roughly at 90 degrees relative to the circumferential direction; it is a radial carcass ply.

The ply of circumferentially oriented cords 7 is composed of spiral-wound textile fibers in order to secure a good binding of the crown 2. In the example of FIG. 1, those textile fibers are an adhered yarn with titer equal to 521 tex made from two identical aramid strands of 167 tex individually overtwisted at 280 t/m and of a nylon strand of 140 tex overtwisted at 280 t/m, those three strands then being simultaneously retwisted at 280 t/m in the opposite direction. The initial modulus of that cord is equal to 740 cN/tex and the stress developed under 3% strain is equal to 30 cN/tex.

Figure 8:
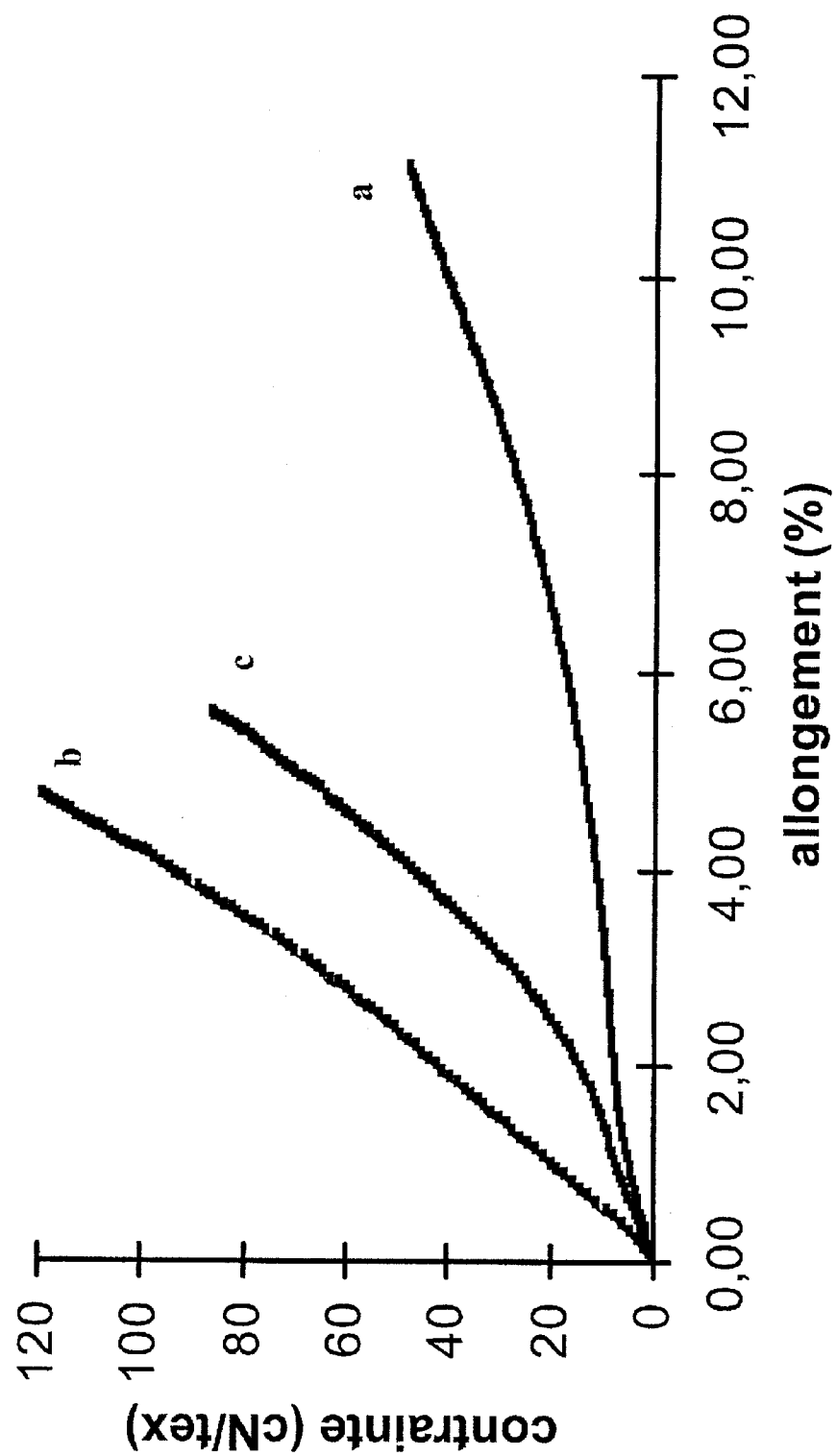
FIG. 8 presents the elongation force curves of three types of cords described below.

FIG. 8 presents a force-elongation curve of that cord as well as those of two other common cords.

curve a: nylon cord (2 nylon strands of 441 tex);

curve b: aramid cord (2 aramid strands of titer 167 tex);

curve c: aramid-nylon cord.

The nylon cord (curve a) is an adhered yarn of titer 441 tex made from 2 identical nylon strands of 210 tex individually overtwisted at 200 t/m (turns/meter) and then simultaneously retwisted at 200 t/m in the opposite direction. The initial modulus of that cord is equal to 530 cN/tex, and the stress developed under 3% is 9 cN/tex. That cord therefore has a low modulus of elasticity at weak and at strong strains.

The aramid cord (curve b) is an adhered yarn of titer equal to 376 tex made from 2 identical aramid strands of 167 tex individually overtwisted at 440 t/m and then simultaneously retwisted at 440 t/m in the opposite direction. The initial modulus of that cord is equal to 2030 cN/tex, and the stress developed under 3% is 68 cN/tex. That cord has a high modulus of elasticity.

The cords illustrated in curves b and c present the advantage of having a high modulus of elasticity at heavy strains, which gives them great efficiency in binding the crowns of the tires, while limiting the cord density necessary. The aramid-nylon cord also has a low initial modulus, which has the advantage of improving tire comfort and reducing its low-speed coast by running noise.

The crown reinforcing ply 5 has an axial width L' and ply 6 an axial width L. At the axial end of ply 6 represented, in a zone whose axial distance from the equatorial plane P of the tire ranges between L/2−h and L/2+H, the laying pitch of the cords of ply 7 is very markedly increased. In that zone there is only one circumferential cord turn. The laying pitch p is therefore greater than or equal to H +h. That makes it possible to limit the risks of abrasive contract between the cords of ply 7 and those of the axial end of cord 6. To be effective, the values of H and h are greater than or equal to 2 mm; h ranges between 2 and 10 mm.

In the case of a hybrid 167*167*140 at 100 f/dm (the laying pitch is therefore 1 mm), that arrangement means removing 4 to 5 binding cords in that sensitive circumferential zone. Taking the high modulus of that hybrid into account, the overstress on centrifugation is very low.

Figure 2:
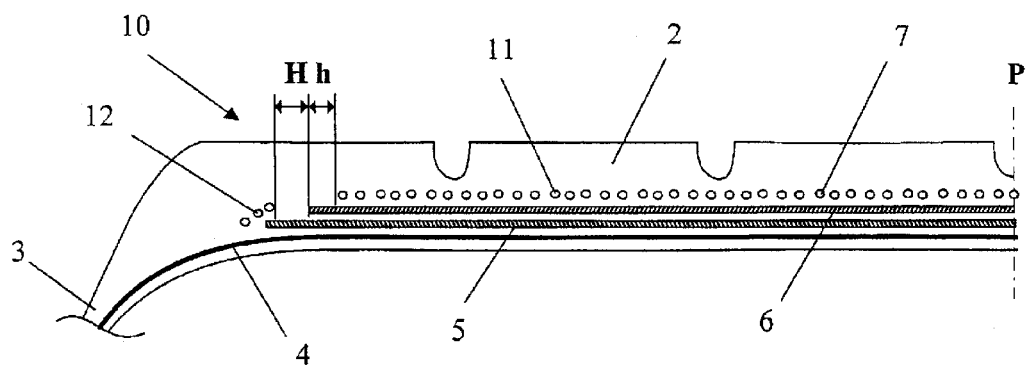
FIG. 2 presents an axial half-section of a second embodiment of the tire of FIG. 1.

FIG. 2 presents a partial axial half-section of a second tire according to the invention, similar to tire 1. In tire 10 the ply of circumferential cords 7 includes a first spiral winding 11 extending from the equatorial plane of the tire P to an axial distance L/2−h and a second spiral winding 12 extending outward beyond the axial distance L/2+H from plane P. The placement of ply 7 is thus made in three successive phases, a first winding on a first side of the crown, then winding on the central part of the crown and, finally, a third winding on the other side of the crown. That solution takes more working time than the previous one, but the risk of any abrasive contact between two circumferential cords oriented at a is reduced.

Figure 3:
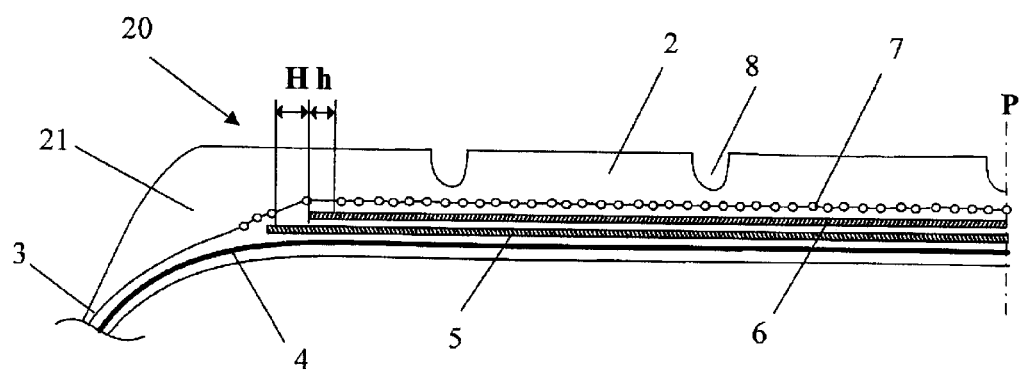
FIG. 3 presents a variant of a tire according to the invention.

FIG. 3 presents an axial half-section of a tire 20 in which the tread 21 is in direct contact with the reinforcing cords of the ply 7. That means that the tread 21 constitutes a "rubber bonding layer" for the ply 7. In fact, on fabrication of the tire, after having placed reinforcing plies 5 and 6 as well as their bonding layers, the cord of ply 7 is applied by spiral winding. That cord is applied alone, that is, without being previously assembled by belt of two cords or more with a rubber bonding. The rubbery compound of the tread is then placed directly on the individual cords of the ply 7, and it is therefore that rubbery compound of the tread which is going to be in contact with the circumference of the cords of ply 7 and adhere to them. That facilitates manufacture of the tire by reducing the number of different products to be laid as well as the time necessary for that manufacture.

Figure 4:
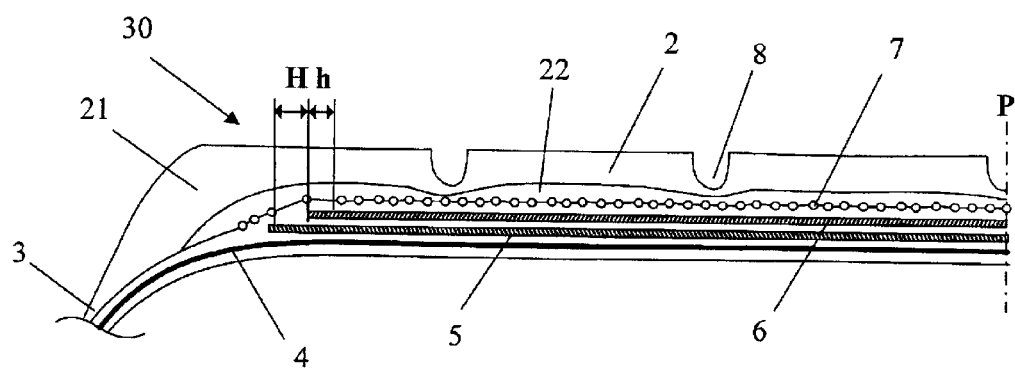
FIG. 4 presents a second variant of a tire according to the invention.

In FIG. 4 the tire 30 contains, between the tread 21 and the ply of circumferentially oriented cords 7, an underlayer 22. That underlayer 22 is applied directly on the cords of ply 7. The so-called underlayer compounds are intended to improve various performances like consumption or drift rigidity of the tires.

Figure 5:
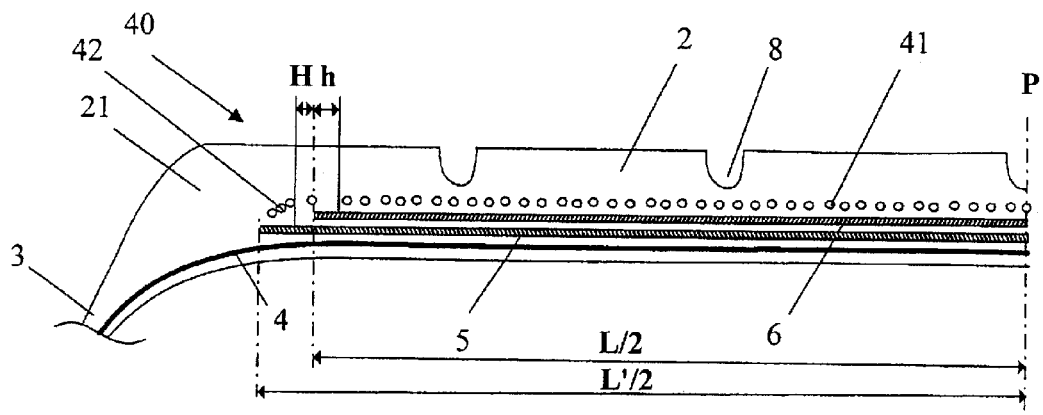
FIGS. 5, 6 and 7 present three other working variants of a tire according to the invention.
Figure 6:
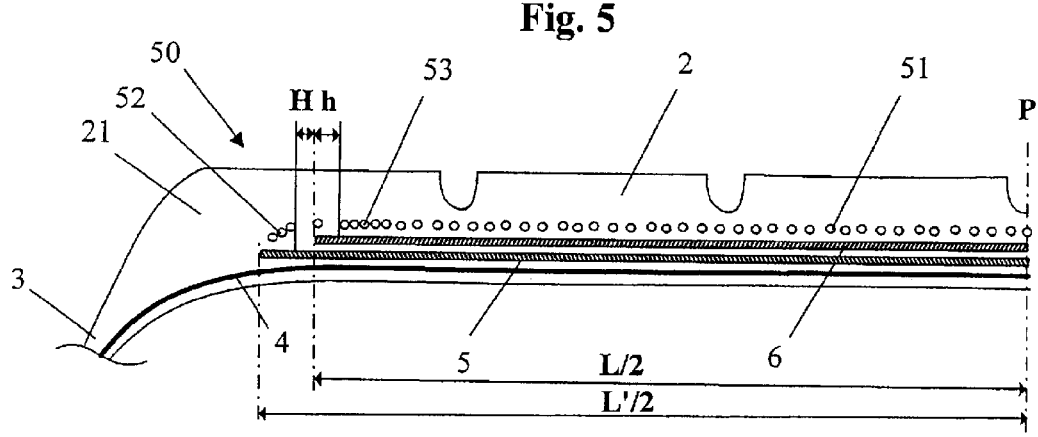
Figure 7:
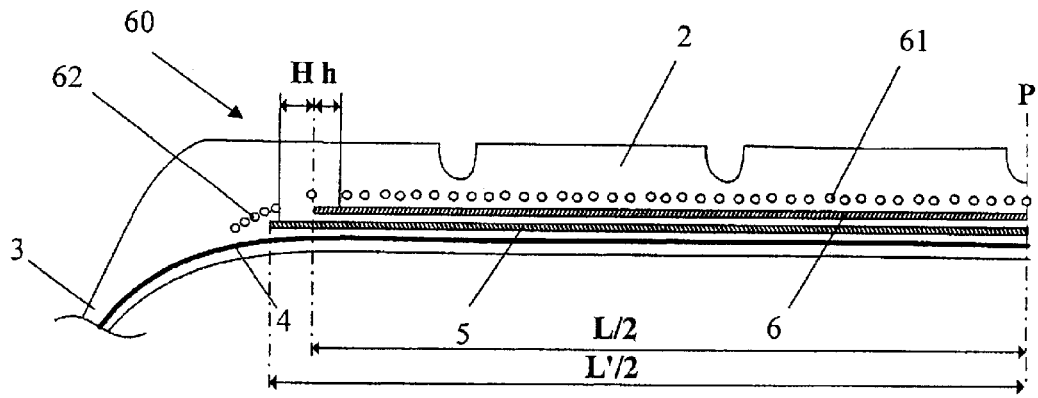

FIGS. 5, 6 and 7 present preferential embodiments of the tire crown of FIG. 1.

In FIG. 5 an axial half-section of a tire 40 is shown, in which the ply of circumferential cords 41 consists of a spiral winding with, as before, an increase of the laying pitch opposite the end of the second reinforcing ply crossed 6. Ply 41 extends axially within the axial end of the second reinforcing ply crossed 5. In zone 42 of ply 41, placed axially between the ends of ply 6 and ply 5, the laying pitch of ply 41 is reduced in order to compensate for and even increase the average density of circumferential reinforcing cords in that zone of the tire.

That compensation for the reduction of number of circumferential reinforcing cords due to increase of the laying pitch above the end of ply 6 is also possible on both sides of that end. That is what is presented in FIG. 6. The circumferential cord ply 51 of tire 50 illustrated on FIG. 6 contains two zones where the laying pitch of the cord is diminished relative to the central zone of the crown: zone 52 axially lying between the axial ends of the two plies 5 and 6 and zone 53 axially lying inward relative to L−h. The cord of ply 51 is also applied with a markedly increased laying pitch in the zone lying between L−h and L+H axially embracing the end of ply 6.

Finally, FIG. 7 presents an embodiment similar to that of FIG. 5. The tire 60 illustrated on that figure is such that the ply of circumferential cords 61 extends axially beyond the axial end of the crossed reinforcing ply 5. The corresponding zone 62 preferably has a laying pitch also diminished relative to the laying pitch of the cord in the central zone of ply 61. That embodiment improves the resistance of the tire crown at high speed.

Tires 195/65-15 were made with the following configurations:

control A included a crown with two crossed wire plies (in 6.23 NF cables at 80 f/dm oriented at 23°) with a circumferential cord ply consisting of cords corresponding to FIG. 8c (aramid-nylon hybrid cords); that ply had been wound with a uniform pitch of three mm and extended beyond the end of the adjacent crossed reinforcing ply, but within the axial end of the other reinforcing ply;

tire B is similar to the embodiment of FIG. 5, ply 41 presented a large laying pitch above the end of ply 6 as well as a smaller laying pitch in zone 42, beyond the end of ply 6;

tire C corresponds to FIG. 6, with a circumferential cord laying pitch of 1 mm on both sides of the end of ply 6; and tire D similar to tire B, but with, in addition, ply 41 extending axially beyond the end of ply 5 over 5 mm.

Those tires underwent a test of resistance to running at high speed. That test corresponds to subjecting the tire, at nominal load, to a continuous increase of running speed of 60 km/h. The starting speed of the test is 210 km/h. The result is given by the speed at which the tire failed. The test is conducted on a gear wheel equal to 5.36 m.

Table 1 gives the results of that test.

| Tire | Maximum speed (km/h) |
|---|---|
| A | 243 |
| B | 247 |
| C | 253 |
| D | 270 |

Solution B appreciably improves the limit speed attained; that indicates the importance of reducing the risks of abrasive contact between the circumferential cords and the ends of the cords of the adjacent wire ply. This result is obtained when the real density of circumferential cords is less in tire B than in control A.

The act of restoring the same cord density of solution C confirms the importance of the solution of the invention.

Finally, the result of tire D illustrates the very important role for that performance of having an excellent binding of the shoulder zone of the tire.

According to a first embodiment, the tire according to the invention can advantageously be fabricated on a rigid core setting the shape of its inner cavity, as described by U.S. Pat. No. 4,895,692 or U.S. Pat. No. 6,224,808. All the constituents of the tire are applied on that core, in the order required by the final architecture, being directly arranged in their final place, without undergoing shaping at any time of fabrication. Curing is carried out on the core, the latter being removed only after the vulcanization phase. That fabrication can, notably, use the devices described in patent U.S. Pat. No. 5,185,051 for laying the cords of the carcass cord, U.S. Pat. No. 4,804,436 or U.S. Pat. No. 4,952,259 for laying the crown cords and U.S. Pat. No. 4,963,207, U.S. Pat. No. 5,171,394 or U.S. Pat. No. 5,221,406 for laying the rubbery compounds.

This manufacturing method has the advantage of markedly reducing, if not eliminating the prestresses imposed on the cords, particularly on those oriented at 0°, on the traditional shaping phases.

According to a second embodiment, the core casing can be partially cooled in order to keep the cords in the state of strain required on laying.

The tire can also equivalently be manufactured on a drum, such as described in U.S. Pat. No. 6,234,227 or U.S. Pat. No. 6,000,454, on condition that the tire blank is shaped before laying the circumferentially oriented cords.

Laying of the circumferentially oriented cords can also be carried on out on a form with geometry identical to the form sought in the curing mold. The crown block is then assembled with the complementary blank of the tire according to transfer techniques known to the expert and then, still following known principles, the tire is encased and pressurized by deployment of a membrane inside the tire.

That embodiment also guarantees the absence of prestresses due to vulcanization press forming.

All those embodiments make it possible to have the circumferentially oriented cords spiral-wound, with laying diameters departing, over the whole width of the crown, by less than 0.5% from the final diameters of those cords in the tire after vulcanization.

What is claimed is:

1. A tire having a crown extended by two sidewalls and two beads, with a carcass anchored in the two beads, in which said crown comprises from radially inside:

at least one reinforcing ply of axial width L, formed by parallel cords oriented at an angle $\alpha$ of between 10 and 75 degrees relative to the circumferential direction, and at least one ply of spirally wound, generally circumferentially oriented cords, arranged radially outside said reinforcing ply and extending axially beyond said reinforcing ply, wherein, in zones located axially outward a distance ranging between distances L/2−h and L/2+H relative to the equatorial plane of the tire, a laying pitch of said spirally wound cords is at least equal to an axial distance H +h, the values of H and h being at least equal to 2 mm, and wherein said ply of spirally wound cords has an axial width greater than L +2H.

2. A tire according to claim 1, wherein a laying pitch of the ply of spirally wound cords in the zone located axially outward beyond the axial distance L/2+H is less than a laying pitch of the spirally wound cords in a center zone located within a distance L/2−h from the equatorial plane.

3. A tire according to claim 1, wherein a laying pitch of the ply of spirally wound cords in a zone located axially inward in proximity to the axial distance L/2−H, is less than a laying pitch of the spirally wound cords in a center zone located within a distance L/2−h from the equatorial plane.

4. A tire according to claim 1, wherein the tire crown includes a second reinforcing ply of axial width L', formed by parallel cords oriented at an angle $\beta$ of between 10 and 75 degrees relative to the circumferential direction and arranged radially inward from the first reinforcing ply of axial width L, said ply of circumferential cords extends axially within axial distance L'/2 from the equatorial plane.

5. A tire according to claim 1, wherein the tire crown includes a second reinforcing ply of axial width L', formed by parallel cords oriented at an angle $\beta$ of between 10 and 75 degrees relative to the circumferential direction and arranged radially inward from the first reinforcing ply of axial width L, said ply of circumferential cords extends axially beyond axial distance L'/2 from the equatorial plane.

6. A tire according to claim 1, wherein the axial distance h ranges between 2 and 10 mm.

7. A tire according to claim 1, wherein the axial distance H is greater than 2 mm.

8. A tire according to claim 1, wherein the crown further comprises a tread, said tread being in direct contact with said ply of spirally wound cords.

9. A tire according to claim 8, wherein the tread includes a first layer intended to come in contact with the road, and an underlayer located radially under said first layer, said underlayer being in direct contact with said ply of spirally wound cords.

10. A tire according to claim 1, wherein the ply of spirally wound cords includes at least two simultaneously spirally wound cords.

11. A tire according to claim 10, wherein the ply of spirally wound cords includes not more than four simultaneously spirally wound cords.

12. A tire according to claim 1, wherein the cords of the ply of spirally wound cords develop a stress under 3% strain exceeding 12 cN/tex.

13. A tire according to claim 12, wherein the cords of the ply of spirally wound cords develop a stress under 3% strain exceeding 20 cN/tex.

14. A tire according to claim 12, wherein the cords of the ply of spirally wound cords possess an initial modulus of less than 900 cN/tex.

15. A tire according to claim 14, wherein the cords of the ply of spirally wound cords possess an initial modulus of less than 800 cN/tex.

16. A tire according to claim 1, wherein the cords of the ply of spirally wound cords comprise hybrid cables combining at least one nylon yarn and at least one aramid yarn.

17. A tire according to claim 1, wherein the cords of the ply of spirally wound cords present a high-temperature standard contraction potential of less than 3.5%.

18. A tire according to claim 1, wherein the cords of the ply of spirally wound cords are spirally wound with laying diameters approximately corresponding, over the whole width of the crown, to final diameters of said cords in the tire after vulcanization.

19. A tire having a crown extended by two sidewalls and two beads, with a carcass anchored in the two beads, in which said crown comprises radially from the inside:

at least one reinforcing ply of axial width L, formed by parallel cords oriented at an angle $\alpha$ of between 10 and 75 degrees relative to the circumferential direction, and at least one ply of generally circumferentially oriented, spirally wound cords, arranged radially outside relative to said reinforcing ply and extending axially beyond said reinforcing ply, wherein said ply of spirally wound cords comprises, at least on one side of the equatorial plane of the tire, a first spiral winding extending from the equatorial plane of the tire axially outward an axial distance of $L/2-h$, and at least a second spiral winding extending axially outward beyond a point located an axial distance $L/2+H$ from the equatorial plane of the tire.

20. A tire according to claim 19, wherein the laying pitch of the at least second spiral winding is less than the laying pitch of the cords in the first spiral winding.

21. A tire according to claim 19, wherein the laying pitch of the first spiral winding, in a zone being at an axial distance $L/2-H$ to an axial distance $L/2$ from the equatorial plane, is less than the laying pitch of a zone extending from the equatorial plane to a distance $L/2$ from the equatorial plane.

22. A tire according to claim 19, wherein the tire crown includes a second reinforcing ply of axial width $L'$, formed by parallel cords oriented at an angle β of between 10 and 75 degrees relative to the circumferential direction and arranged radially inward from the first reinforcing ply of axial width L, said ply of spirally wound cords extending axially within an axial distance $L'/2$ from the equatorial plane.

23. A tire according to claim 19, wherein the tire crown includes a second reinforcing ply of axial width $L'$, formed by parallel cords oriented at an angle β of between 10 and 75 degrees relative to the circumferential direction and arranged radially inward from the first reinforcing ply of axial width L, said ply of spirally wound cords extending axially beyond an axial distance $L'/2$ from the equatorial plane.

24. A tire according to claim 19, wherein the axial distance h ranges between 2 and 10 mm.

25. A tire according to claim 19, wherein the axial distance H is greater than 2 mm.

26. A tire according to claim 19, wherein the crown further comprises a tread, said tread being in direct contact with said ply of spirally wound cords.

27. A tire according to claim 26, wherein the tread contains an outer layer intended to come in contact with the road, and an underlayer radially placed under said outer layer, said underlayer being in direct contact with said ply of spirally wound cords.

28. A tire according to claim 19, wherein the ply of spirally wound cords includes at least two simultaneously spirally wound cords.

29. A tire according to claim 28, wherein the ply of spirally wound cords includes not more than four simultaneously spirally wound cords.

30. A tire according to claim 19, wherein the cords in the ply of spirally wound cords develop a stress under 3% strain exceeding 12 cN/tex.

31. A tire according to claim 30, wherein the cords of the ply of spirally wound cords develop a stress under 3% strain exceeding 20 cN/tex.

32. A tire according to claim 30, wherein the cords of the ply of spirally wound cords possess an initial modulus of less than 900 cN/tex.

33. A tire according to claim 32, wherein the cords of the ply of spirally wound cords possess an initial modulus of less than 800 cN/tex.

34. A tire according to claim 19, wherein the cords of the ply of spirally wound cords are hybrid cables combining at least one nylon yarn and at least one aramid yarn.

35. A tire according to claim 19, wherein the cords of the ply of spirally wound cords present a high-temperature standard contraction potential of less than 3.5%.

36. A tire according to claim 19, wherein the cords of the ply of spirally wound cords are wound with laying diameters approximately corresponding, over the whole width of the crown, to the final diameters of said cords in the tire after vulcanization.

* * * * *